US010262073B2

(12) United States Patent
Kumar et al.

(10) Patent No.: US 10,262,073 B2
(45) Date of Patent: Apr. 16, 2019

(54) GENERATING AND DISTRIBUTING INTERACTIVE DOCUMENTS

(71) Applicant: Accenture Global Services Limited, Dublin (IE)

(72) Inventors: Pravesh Kumar, New Delhi (IN); Bhawesh Agrawal, New Delhi (IN); Alex Astovasadourian, Clamart (FR); Olivier Naro, Clamart (FR); Vincent Cabanel, Boulogne Billancourt (FR); Ganesan Ramachandran, Haryana (IN)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 15/246,956

(22) Filed: Aug. 25, 2016

(65) Prior Publication Data
US 2017/0068743 A1 Mar. 9, 2017

(30) Foreign Application Priority Data
Sep. 9, 2015 (IN) .................................... 47852015

(51) Int. Cl.
*G06F 17/00* (2019.01)
*G06F 17/30* (2006.01)
(Continued)

(52) U.S. Cl.
CPC ...... *G06F 17/30896* (2013.01); *G06F 17/217* (2013.01); *G06F 17/2288* (2013.01);
(Continued)

(58) Field of Classification Search
None
See application file for complete search history.

(56) References Cited

U.S. PATENT DOCUMENTS 6,345,279 B1 2/2002 Li et al.
7,496,580 B2 2/2009 Hajdukiewicz et al.
(Continued)

FOREIGN PATENT DOCUMENTS

EP 1376406 1/2004
JP 2007249387 9/2007

OTHER PUBLICATIONS

Japanese Office Action for Application No. 2016174781, dated Jul. 11, 2017, 10 pages. (With English Translation).
(Continued)

*Primary Examiner* — Howard Cortes
(74) *Attorney, Agent, or Firm* — Fish & Richardson P.C.

(57) ABSTRACT

Methods, systems, and apparatus, including computer programs encoded on a computer storage medium, for generating and distributing interactive documents. An interactive document generation platform receives information that defines a series of interactive pages of an interactive document to be provided for facilitating performance of a procedure, receives multimedia content to be presented with interactive pages of the interactive document, and generates a data package that includes metadata, structural data, and multimedia content for the interactive document. The data package is provided to an interactive document distribution platform configured for adapting the interactive document for presentation by a plurality of different types of computing devices, receiving a request for the interactive document for a computing device of a particular type, and providing to the computing device a version of the interactive document that is adapted for presentation by the particular type of the computing device.

15 Claims, 16 Drawing Sheets

(51) Int. Cl.
*G06F 17/24* (2006.01)
*G06F 17/21* (2006.01)
*G06F 17/22* (2006.01)

(52) U.S. Cl.
CPC ........ *G06F 17/24* (2013.01); *G06F 17/30011* (2013.01); *G06F 17/30056* (2013.01); *G06F 17/30058* (2013.01)

(56) References Cited

U.S. PATENT DOCUMENTS

| | | | | |
|---|---|---|---|---|
| 8,818,898 | B2* | 8/2014 | Schlossberg | G06Q 30/02 482/148 |
| 9,449,126 | B1* | 9/2016 | Genoni | G06F 17/5027 |
| 2002/0120721 | A1* | 8/2002 | Eilers | G06F 17/30905 709/220 |
| 2004/0128624 | A1 | 7/2004 | Arellano et al. | |
| 2005/0204337 | A1* | 9/2005 | Diesel | G09B 7/00 717/113 |
| 2007/0206221 | A1* | 9/2007 | Wyler | G06F 17/30905 358/1.15 |
| 2007/0249387 | A1 | 10/2007 | Doradla et al. | |
| 2007/0260607 | A1 | 11/2007 | Hajdukiewicz et al. | |
| 2008/0065980 | A1 | 3/2008 | Hedbor | |
| 2008/0068980 | A1* | 3/2008 | Lim | H04L 5/0048 370/208 |
| 2008/0215966 | A1* | 9/2008 | Suarez | G06F 17/30905 715/252 |
| 2009/0281976 | A1* | 11/2009 | Liu | G06F 17/30905 706/47 |
| 2011/0113316 | A1 | 5/2011 | Datha et al. | |
| 2011/0159472 | A1* | 6/2011 | Eck | G09B 5/06 434/322 |
| 2013/0019028 | A1* | 1/2013 | Myers | G06F 17/2235 709/246 |
| 2014/0068408 | A1* | 3/2014 | Le Chevalier | G06F 17/2229 715/234 |

OTHER PUBLICATIONS

Australian Office Action for Application No. 2016225777, dated Dec. 16, 2016, 12 pages.
European Extended Search Report for Application No. 16185258.7, dated Jan. 12, 2017, 8 pages.

* cited by examiner

GENERATING AND DISTRIBUTING INTERACTIVE DOCUMENTS

CROSS-REFERENCE TO RELATED APPLICATION

This application claims priority to Indian Patent Application No. 4785/CHE/2015, filed on Sep. 9, 2015, entitled "GENERATING AND DISTRIBUTING INTERACTIVE DOCUMENTS," the entirety of which is hereby incorporated by reference.

BACKGROUND

Information about procedures, such as instructions for assembling, installing, and servicing products and equipment, is generally conveyed through static documentation. Static documentation may include printed documents, or may include fixed-layout flat documents for presentation by a computing device, such as a desktop, laptop, or tablet device. Digital content can be provided to computing devices over a network.

SUMMARY

Implementations of the present disclosure include computer-implemented methods for generating and distributing interactive documents. In some implementations, actions include receiving, by an interactive document generation platform, information that defines a series of interactive pages of an interactive document to be provided for facilitating performance of a procedure, receiving, by the interactive document generation platform, multimedia content to be presented with one or more of the interactive pages of the interactive document, generating, by the interactive document generation platform, a data package that includes metadata, structural data, and multimedia content for the interactive document, and providing the data package that includes metadata, structural data, and multimedia content for the interactive document to an interactive document distribution platform. The interactive document distribution platform can be configured for adapting the interactive document for presentation by a plurality of different types of computing devices, receiving a request for the interactive document for a computing device of a particular type, and providing to the computing device a version of the interactive document that is adapted for presentation by the particular type of the computing device. Other implementations of these aspects include corresponding systems, apparatus, and computer programs, configured to perform the actions of the methods, encoded on computer storage devices.

These and other implementations can each optionally include one or more of the following features. The interactive document generation platform can provide an editor interface for defining the interactive document. The editor interface can include an interface for specifying information for identification of the interactive document and guidelines for performance of the procedure. The editor interface can include an interface for defining the series of interactive pages of the interactive document, including a selection control for selecting multimedia content to be presented with a particular interactive page, and a presentation control for presenting the interactive page as it is to be presented by an interactive document presentation interface of the computing device. The editor interface can include an interface for defining sections of the interactive document. The editor interface can include an interface for specifying multimedia content to be presented with one or more of the interactive pages of the interactive document. The information that defines a series of interactive pages can be included in a static document. The static document can be received, a mapping component that maps elements of the static document to elements of the interactive document can be accessed, and the editor interface can be populated to include mapped elements of the interactive document. The metadata can include information for identification of the interactive document and guidelines for performance of the procedure. Generating the data package can include generating a file for providing the metadata. The interactive document generation platform can receive information that defines a plurality of sections of the interactive document. Each section can include one or more interactive pages. The structural data can include definition information for each of the plurality of sections and definition information for the one or more interactive pages included in each section. Generating the data package can include generating a different file for providing the structural data for each section. The definition information for each of the one or more interactive pages can include information for sequencing the interactive page in the interactive document, content to be presented with the interactive page of the interactive document, and a template for presenting content of a particular type. The interactive document distribution platform can be configured for receiving one or more search parameters, retrieving and presenting identification information associated with one or more interactive documents that match the one or more search parameters, and receiving a selection of one or more of the interactive documents to be provided to the computing device. The interactive document distribution platform can be configured for receiving information from the computing device that indicates that the procedure has been completed. The interactive document distribution platform can be configured for receiving modifications to the interactive document from the computing device, and providing the modifications to the interactive document generation platform. Adapting the interactive document for presentation by a plurality of different types of computing devices can include transforming the multimedia content to a format that is suitable for presentation by the particular type of the computing device.

Implementations of the present disclosure provide one or more of the following advantages. Interactive documents can be presented by computing devices, including smart mobile devices, and can be used to facilitate the performance of complex procedures by an operator. Interactive document pages can be adapted for presentation by multiple different types of computing devices. Static documents in a proprietary format can be converted into interactive documents. Feedback and modifications for an interactive document can be collected by computing devices (e.g., smart mobile devices) through the document and can be used to generate subsequent document versions.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 5A-5E depict example user interface screens provided by the example system for adapting and distributing interactive documents.

DETAILED DESCRIPTION

Figure 1:
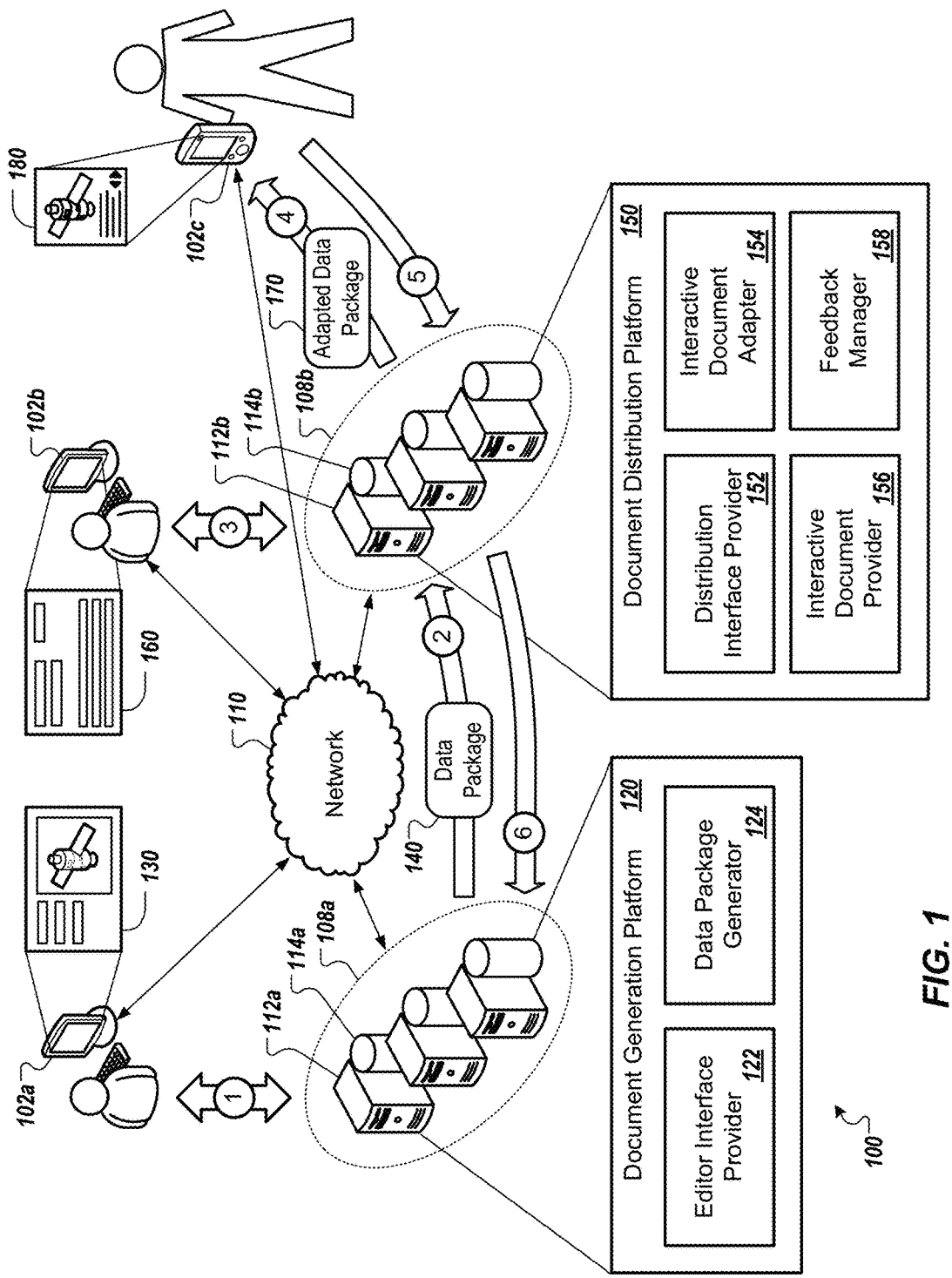
FIG. 1 depicts an example system that can execute implementations of the present disclosure.

Implementations of the present disclosure are generally directed to editing, generating, adapting, and distributing interactive documents for presentation by computing devices of various different types. For complex technologies, such as technologies in the manufacturing, telecommunications, and medical equipment industries, interactive documents may be more suitable than static documents for conveying information about procedures (e.g., instructions for assembling, installing, and servicing products and equipment, training materials, etc.). In general, an interactive document can include a series of interactive pages which may be navigated by a user at a computing device. Interactive pages, which in some examples may also be referred to as slides or cards, may include one or more elements, including text content, multimedia content (e.g., audio, video, and images), and feedback mechanisms (e.g., checklists, surveys, and mechanisms for providing text revisions and updated multimedia content). Interactive documents can be provided to various computing devices to facilitate document access in production environments. Example computing devices include tablets, wearables (e.g., glasses, watches), and/or smart mobile devices.

In accordance with implementations of the present disclosure, an editor can be provided to create interactive documents and/or to facilitate the conversion of static documents into interactive documents. The editor can generate a data package for an interactive document that includes structure and metadata information, and multimedia content. The structure and metadata information can be stored in a collection of files, including a header file that contains general information about a procedure (e.g., procedure name and requirements), and a file for each section of the interactive document that contains information for presenting a series of interactive pages relevant to the section. After the data package associated with the interactive document is generated, the document can be provided to an interactive document distribution platform.

In accordance with implementations of the present disclosure, the interactive document distribution platform can be configured to facilitate the provision of interactive documents to computing devices. A selected interactive document can be modified (or an appropriate version of the document can be provided) for presentation by a particular type of computing device. Multimedia content can be transformed (e.g., cropped, resized, or downsampled) based on the device's presentation and/or communications capabilities. The modified interactive document can be provided to a computing device for presentation, and a procedure can be performed using the document as a guide. Based on the computing device's capabilities, the interactive document can be navigated through and interacted with using various techniques (e.g., voice commands, touch screens, motion sensors, etc.). Information regarding use of the interactive document can be collected by the computing device and provided to the interactive document distribution platform. Feedback collected by the computing device and new multimedia content generated by the computing device can be used for updating the interactive document.

FIG. 1 depicts an example system 100 that can execute implementations of the present disclosure. In the depicted example, the system 100 includes a computing device 102a that communicates with a server system 108a over a network 110, and computing devices 102b and 102c that communicate with a server system 108b over the network 110. In some example, each of the computing devices 102a, 102b, and 102c can represent various forms of processing devices including, but not limited to, a desktop computer, a laptop computer, a tablet computer, a handheld computer, a personal digital assistant (PDA), a smart phone, a smart watch, a media player, smart glasses, or a combination of any two or more of these data processing devices or other suitable data processing devices. As discussed in further detail herein, the computing device 102a can interact with software executed by the server system 108a, and the computing devices 102b and 102c can interact with software executed by the server system 108b. In some examples, the server system 108a and the server system 108b can be combined into a single server system.

In some implementations, the server system 108a can include one or more servers 112a and databases 114a, and the server system 108b can include one or more servers 112b and databases 114b. In some examples, the servers 112a, 112b can represent various forms of servers including, but not limited to a web server, an application server, a proxy server, a network server, or a server farm. For example, the servers 112a, 112b can be application servers that execute software accessed by the computing devices 102a, 102b, and 102c. In operation, multiple computing devices (e.g., clients) can communicate with the servers 112a, 112b by way of the network 110. In some implementations, users can invoke applications available on the servers 112a, 112b in a user-interface application (e.g., a web browser or client application) running on the computing devices 102a, 102b, and 102c. Each application can individually access data from one or more repository resources (e.g., databases 114a, 114b).

In some implementations, the computing devices 102a, 102b, and 102c can execute software and can invoke applications locally available to the device, and each application can access data from one or more repository resources locally available to the device. For example, the computing device 102*a* can interact with software executed by the same device 102*a*, with storage occurring on the device 102*a* or by the databases 114*a*.

Implementations of the present disclosure are described herein with reference to a non-limiting, example context. The example context includes an interactive document provided for facilitating the performance of an equipment service procedure. It is appreciated, however, that implementations of the present disclosure are applicable in other contexts and/or with other industries, such as manufacturing, telecommunications, natural resources, automotive, and medical equipment industries. In some implementations, the following example stages can be used for editing, generating, adapting, and distributing interactive documents for presentation by computing devices of various different types.

At stage 1, for example, an interactive document generation platform 120 (e.g., provided by the server system 108*a*) can provide an editor interface 130 to the computing device 102*a* to facilitate the creation of an interactive document by an operator of the computing device. For example, the interactive document generation platform 120 can use an editor interface provider 122 (e.g., including one or more software modules, objects, or other suitable components) to provide data to the computing device 102*a* for rendering one or more user interface screens (e.g., by a web browser or client application) and to receive data from the computing device 102*a* that indicates user selections and other data provided using the screens. In the present example, the operator of the computing device 102*a* can define an interactive document that includes a series of interactive pages for guiding a technician through an equipment service procedure (e.g., removing an equipment panel of a propeller assembly).

At stage 2, for example, the interactive document generation platform 120 can generate a data package 140 that includes metadata, structural data, and multimedia content for an interactive document defined using the editor interface 130. For example, the interactive document generation platform 120 can receive a command from an operator of the computing device 102*a* to publish the interactive document, and can use a data package generator 124 (e.g., including one or more software modules, objects, or other suitable components) to generate the data package 140 for the interactive document. After generating the data package 140, for example, the interactive document generation platform 120 can provide the data package to an interactive document distribution platform 150 (e.g., provided by the server system 108*b*). In some implementations, communication and data transfer between the interactive document generation platform 120 and the interactive document distribution platform 150 may be handled through one or more application programming interfaces (API). For example, a Representational State Transfer (REST) application programming interface can be developed to facilitate receiving the interactive document by the interactive document distribution platform 150 from the interactive document generation platform 120.

At stage 3, for example, the interactive document distribution platform 150 can provide a distribution interface 160 to the computing device 102*b* to facilitate the distribution of an interactive document. For example, the interactive document distribution platform 150 can use a distribution interface provider 152 (e.g., including one or more software modules, objects, or other suitable components) to provide data to the computing device 102*b* for rendering one or more interface screens (e.g., by a web browser or client application) and to receive data from the computing device 102*b* that indicates user selections and other data provided using the screens. An operator of the computing device 102*b* can employ the distribution interface 160, for example, to request a published interactive document for distribution to the computing device 102*c*. As another example, an operator of computing device 102*c* can employ the distribution interface 160 to request the published interactive document directly from the interactive document distribution platform 150. The interactive document distribution platform 150 can use the interactive document adapter 154 (e.g., including one or more software modules, objects, or other suitable components), for example, to adapt the data package 140 for the requested interactive document, based on the type of the computing device 102*c* and its capabilities (e.g., screen size and resolution, storage capacity, processor speed, and media format compatibility).

At stage 4, for example, the interactive document distribution platform 150 can provide an adapted data package 170 that includes metadata, structural data, and multimedia content for an interactive document to be presented on a particular type of computing device. For example, the interactive document distribution platform 150 can use an interactive document provider 156 (e.g., including one or more software modules, objects, or other suitable components) to provide the adapted data package 170 to the computing device 102*c* for presentation of a corresponding interactive document. The computing device 102*c*, for example, can include a presentation interface 180 (e.g., an interactive document renderer) configured to interpret and process data included in the adapted data package 170, to present interactive pages of the corresponding interactive document, and to facilitate user interaction (e.g., navigation, playing multimedia content, receiving feedback and/or document modifications) with the interactive document.

At stage 5, for example, the interactive document distribution platform 150 can receive feedback and/or modification data from a computing device. For example, the interactive document distribution platform 150 can use a feedback manager 158 (e.g., including one or more software modules, objects, or other suitable components) to receive feedback data (e.g., checklists, surveys) from the computing device 102*c* related to the interactive document presented by the presentation interface 180. As another example, the feedback manager 158 can receive modification data (e.g., document revisions, new multimedia content) from the computing device 102*c* related to the interactive document.

At stage 6, for example, the interactive document generation platform 120 can receive and process feedback and/or modification data from the interactive document distribution platform 150. For example, the feedback and/or modification data can be used for revising an interactive document, including modifying text, adding and/or removing multimedia content, and/or restructuring the document. After using the editor interface 130 to revise the interactive document, for example, an operator can use the interactive document generation platform 120 to publish an updated version of the document to the interactive document distribution platform 150.

Figure 2:
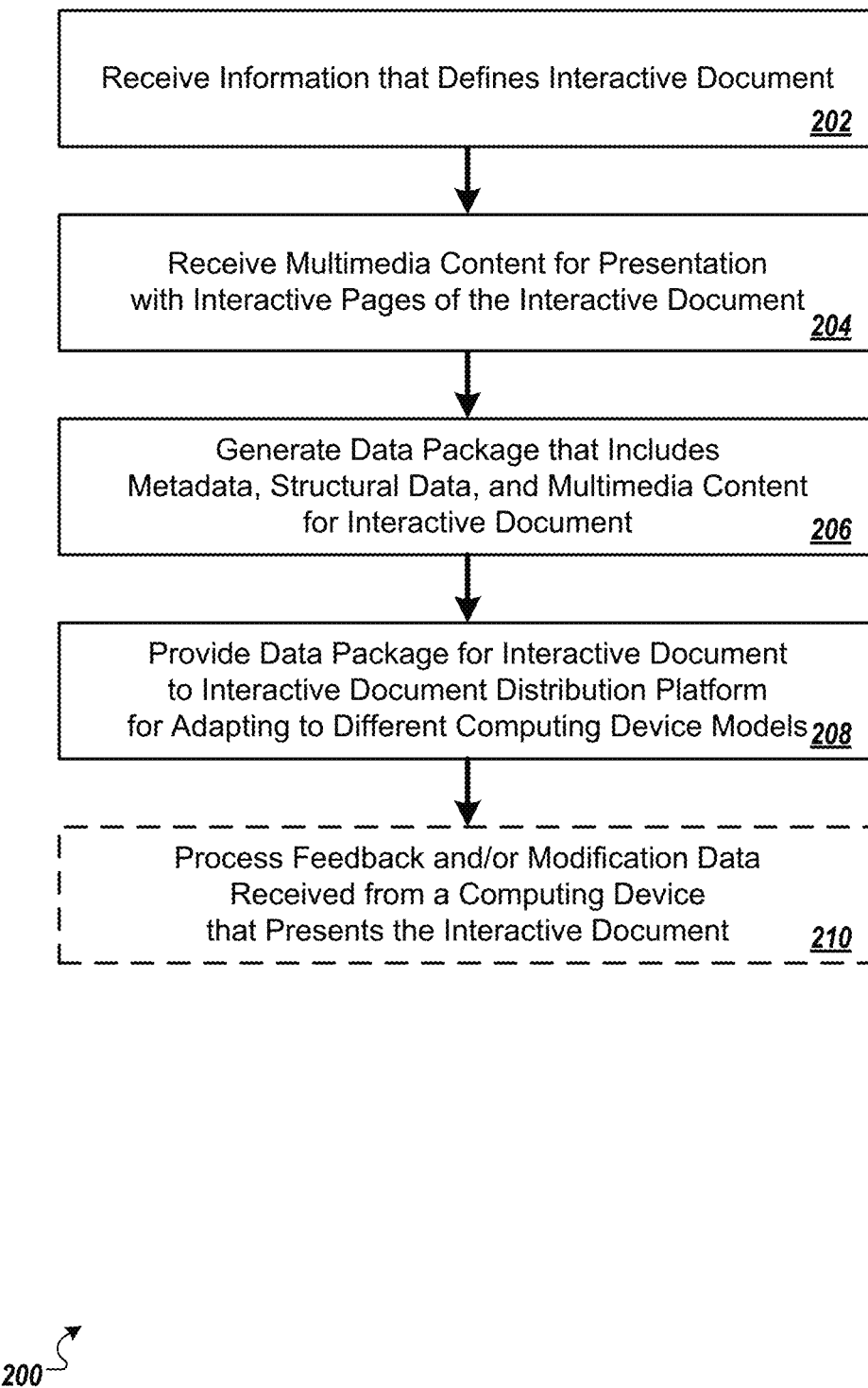
FIG. 2 depicts an example process that can be executed in implementations of the present disclosure.

FIG. 2 depicts an example process 200 that can be executed in implementations of the present disclosure. The example process 200 can be implemented, for example, by the example environment 100 (shown in FIG. 1). In some implementations, the example process 200 can be provided by one or more computer-executable programs executed using one or more computing devices.

Information is received that defines an interactive document (202). For example, the interactive document generation platform 120 can receive interactive document definition information from the computing device 102a. In general, an interactive document may be provided for facilitating the performance of a procedure. Procedures (e.g., instructions for assembling, installing, and servicing products and equipment) may include a sequential series of steps, and each step may be described by an interactive page of the interactive document. Each interactive page, for example, may include one or more descriptive elements for performing the corresponding step of the procedure, including text content and multimedia content (e.g., audio, video, and images). For example, some procedure steps may be described by a video presentation embedded in or linked by an interactive page, other steps may be described by an audio recording, other steps may be described by one or more images, other steps may be described by text, and other steps may be described by a combination of content types.

In some implementations, information may be received that defines a plurality of sections of an interactive document, each section including one or more interactive pages. Sections, which in some examples may also be referred to as chapters or stages, may each include a set of sequential interactive pages of an interactive document grouped for a common purpose. For example, a first section of an interactive document may include interactive pages related to preparation for performing a procedure, a second section may include interactive pages for performing the procedure, and a third section may include interactive pages for concluding the procedure.

In some implementations, an interactive document may include one or more controls for document navigation and/or for providing feedback and modification data related to the document or corresponding procedure. For example, each page of the interactive document can include navigation controls for navigation through the interactive document. One or more pages (e.g., interactive pages) of the interactive document may be provided for receiving feedback data (e.g., ratings, checklists, and surveys), and/or for receiving proposed modifications for the document (e.g., text revisions and updated multimedia content). In general, controls may include user interface controls (e.g., widgets or other suitable software components) for receiving and presenting data.

In some implementations, an editor interface may be provided for defining an interactive document. For example, the interactive document generation platform 120 can provide the editor interface 130 to the computing device 102a to facilitate the creation of the interactive document by an operator of the computing device. Referring to FIGS. 3A-3D, example user interface screens are depicted that may be provided by the editor interface 130 for editing and generating interactive documents.

Figure 3A:
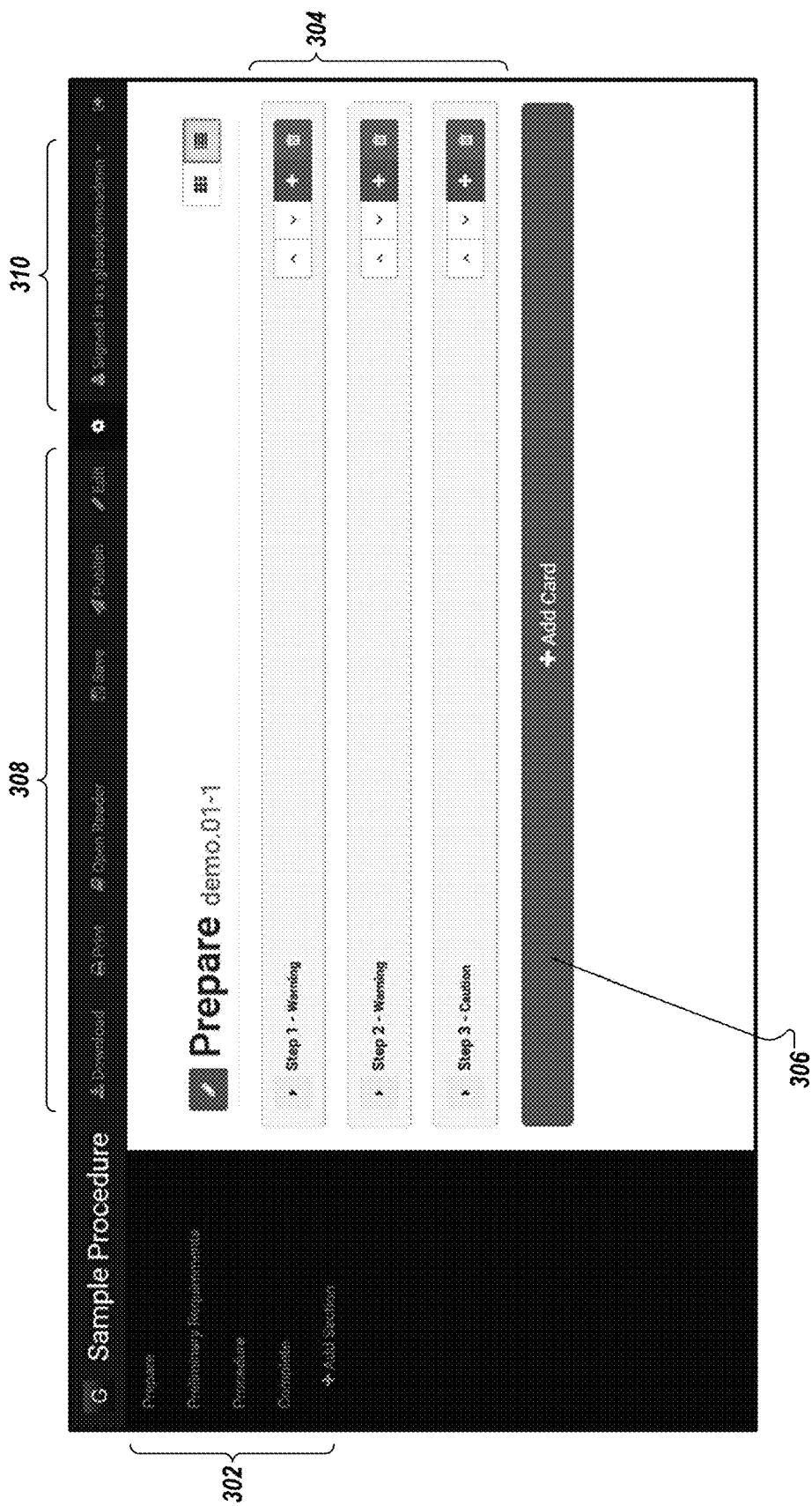
FIGS. 3A-3D depict example user interface screens provided by the example system for editing and generating interactive documents.

In some implementations, an editor interface can include an interface for defining sections of an interactive document. Referring to FIG. 3A, for example, a user interface screen 300 includes a set of controls 302 for selecting a previously created section (e.g., Prepare, Preliminary Requirements, Procedure, and Complete) of the interactive document and for defining a new section (e.g., Add Section). In the present example, a selected section (e.g., Prepare) is shown, and a set of controls 304 is provided, each of the controls being associated with a different interactive page included in the section. Each control of the set of controls 304, for example, can include a control for incrementing the sequential display position of the associated interactive page within the section of the interactive document, a control for decrementing the sequential display position within the section, and a control for removing the interactive page from the section. A control 306, for example, can be provided for adding a new interactive page to the section.

The user interface screen 300, for example, can include additional controls for editing and generating interactive documents. A set of controls 308, for example, can be provided for accessing an interface for specifying general information about an interactive document, for saving a version of the interactive document, for downloading the interactive document, for printing the interactive document, for publishing the interactive document to a distribution platform, and for launching an interactive document presentation interface emulator (e.g., a reader). A set of controls 310, for example, can be provided for logging into an environment for a type of computing device that is to present the interactive document, to facilitate creation of the document and integration of the document with the device.

Figure 3B:

In some implementations, an editor interface can include an interface for specifying information for identification of an interactive document and guidelines for performance of a procedure. Referring to FIG. 3B, for example, a user interface screen 320 includes a set of controls 322 for specifying a title that identifies the interactive document, for specifying reference information for the interactive document, for specifying a family of systems that may be impacted by the interactive document, for specifying an average time to complete a procedure associated with the interactive document, for specifying a number of personnel for completing the procedure, and for providing additional descriptive information. In the present example, the user interface screen 320 includes a control 324 for launching an interface (discussed below and with regard to FIG. 3D) for specifying one or more multimedia files which may be associated with the interactive document.

Figure 3C:
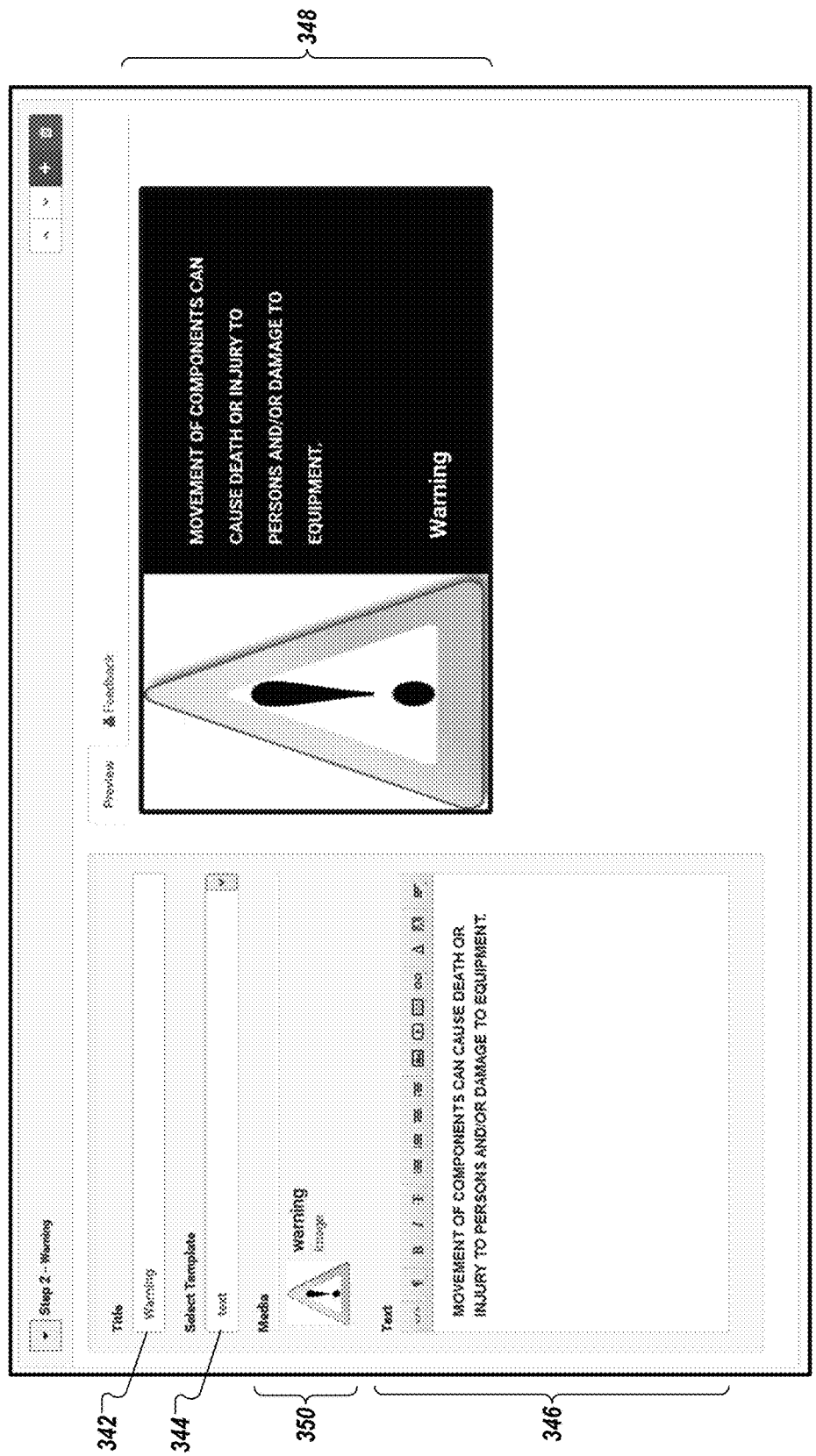

In some implementations, an editor interface can include an interface for defining a series of interactive pages of an interactive document, including a selection control for selecting multimedia content to be presented with a particular interactive page, and a presentation control for presenting the interactive page as it is to be presented by an interactive document presentation interface. Referring to FIG. 3C, for example, a user interface screen 340 includes a control 342 for specifying a title of an interactive page of an interactive document. The title of the interactive page, for example, may be used for identifying the page in the editor interface 130 and in the presentation interface 180. The user interface screen 340 can include a control 344 for selecting a template to be used for creating and presenting an interactive page. Templates, for example, may be used for creating and presenting interactive pages including various types of content, such as text, tables, audio, video, and image content. In the present example, the interactive page being edited is associated with a text template, and text content for the page may be defined using a control 346. A presentation control 348 can be provided by the user interface screen 340 for integrating specified elements of the interactive page and applying the selected template to present the interactive page as it is to appear at a computing device. The user interface screen 340 can include a control 350 for launching an interface (discussed below and with regard to FIG. 3D) for uploading multimedia files and for selecting one or more multimedia files to be associated with the interactive page of the interactive document.

In some implementations, an editor interface may facilitate the cropping or enlarging of multimedia content. For example, the presentation control 348 can include one or more controls for cropping a multimedia file (e.g., an image) to be presented by an interactive page. As another example, the multimedia file may be enlarged and the interactive page may be partitioned into multiple subpages, such that a portion of the file is distributed to each of the subpages and navigation (e.g., up, down, left, right) is facilitated across the subpages.

Referring again to FIG. 2, multimedia content is received for presentation with interactive pages of an interactive document (204). For example, the interactive document generation platform 120 can receive multimedia content (e.g., audio, video, and images) for inclusion with one or more of the interactive pages.

Figure 3D:
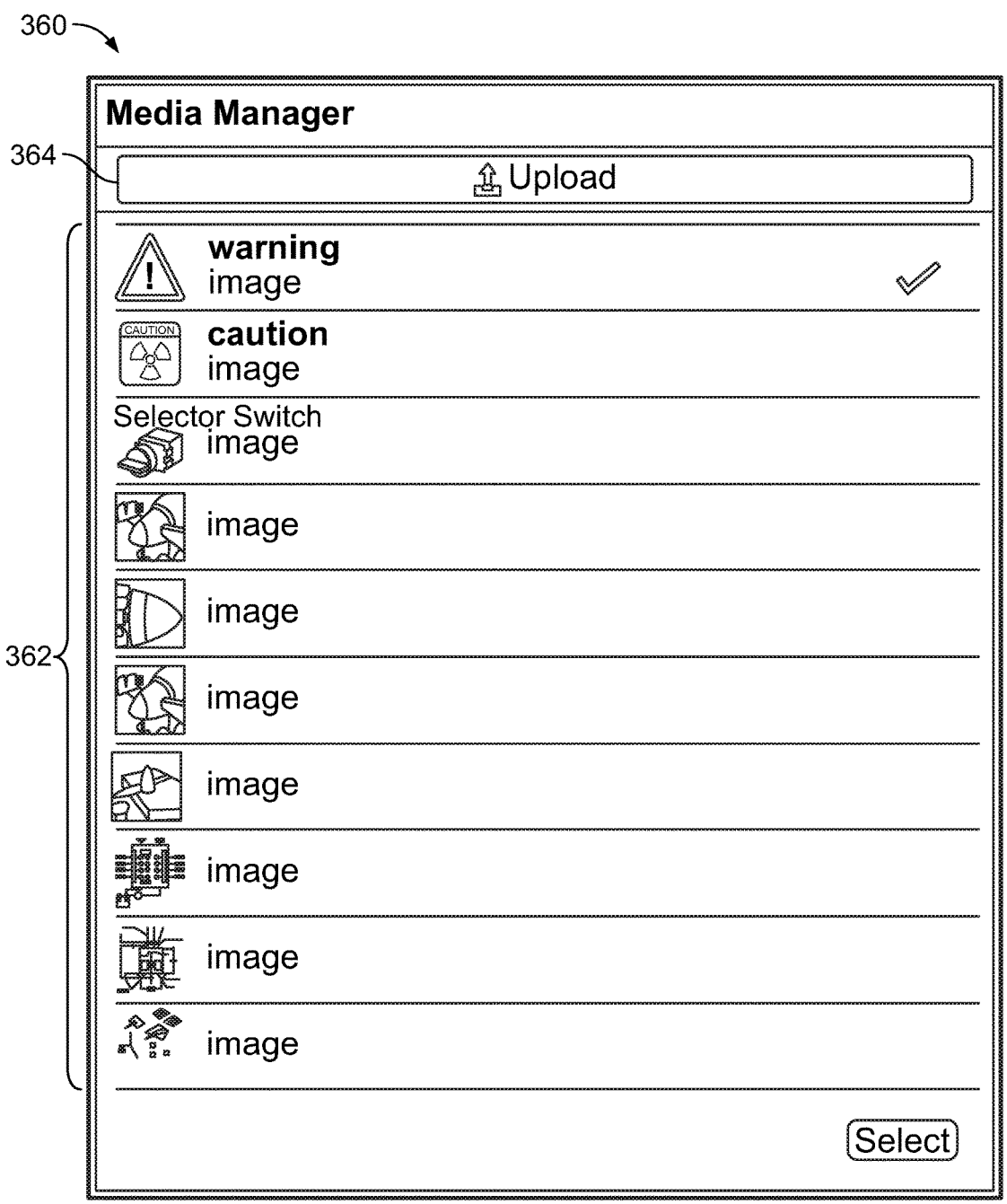

In some implementations, an editor interface can include an interface for specifying multimedia content to be presented with one or more interactive pages of an interactive document. Referring to FIG. 3D, for example, a user interface screen 360 includes a set of controls 362, each control representing a different multimedia content item (e.g., a file) which may be selected for presentation with an interactive page of the interactive document. A control 364, for example, can be provided by the user interface screen 360 for launching an interface to upload (e.g., locate, select, and store) additional multimedia content.

In some implementations, information that defines a series of interactive pages may be included in a static document. The static document may use a text-based format, such as Extensible Markup Language (XML), and may be formatted according to a proprietary data definition structure. Referring to FIG. 1, for example, the static document can be received by the interactive document generation platform 120. A mapping component (e.g., a plugin configured specifically for the proprietary data definition structure) that maps elements of the static document to elements of the interactive document can be accessed by the interactive document generation platform 120, and an interactive document corresponding to the static document can be generated. In some implementations, the editor interface 130 can be populated to include mapped elements of the interactive document. Using the editor interface 130, for example, an operator can validate presentation and navigation aspects of the interactive document, and can add multimedia elements to the document.

Referring again to FIG. 2, a data package is generated that includes metadata, structural data, and multimedia content for an interactive document (206). For example, the interactive document generation platform 120 can use the data package generator 124 to generate the data package 140 for the interactive document. In general, data packages provided for interactive documents may be generating using a lightweight data format including one or more file types, such as JavaScript Object Notation (JSON) files and HyperText Markup Language (HTML) files, standardized for supporting presentation of interactive documents by various types of computing devices.

Figure 4:
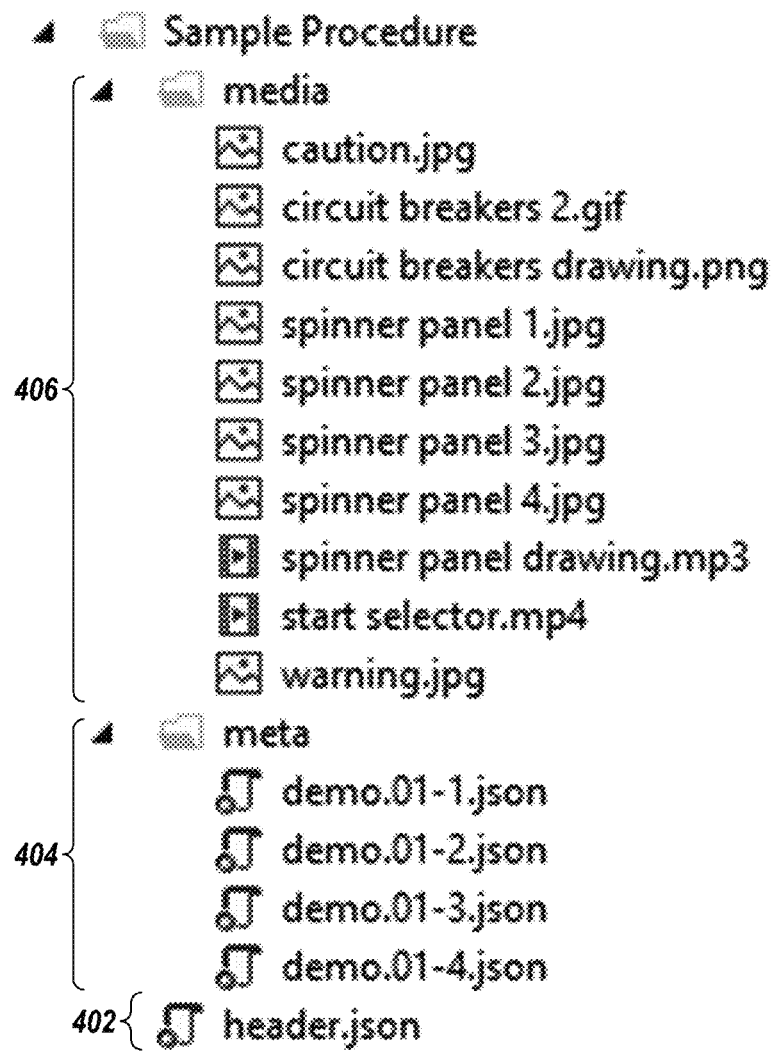
FIG. 4 depicts an example data package for an interactive document.

Referring to FIG. 4, for example, an example data package 400 is shown. In the present example, the data package 400 includes a header file 402 (e.g., a JSON file), a folder including a set of metadata files 404 (e.g., JSON files), and a folder including a set of media files 406 (e.g., audio files, video files, and image files).

In some implementations, generating a data package for an interactive document may include generating one or more files for providing metadata. Metadata included in the header file 402, for example, can include information for identification of the interactive document (e.g., a title and reference identifier) and guidelines for performing a procedure related to the document (e.g., an amount of time to complete a procedure, a number of personnel for completing the procedure, a difficultly level of the procedure, and other suitable guidelines). Metadata included in each of the metadata files 404, for example, can include structural data for defining a section of the interactive document and definition information for one or more interactive pages included in the section. The definition information for each of the interactive pages, for example, can include information for sequencing the interactive page in the interactive document, content (e.g., HTML and multimedia content) to be presented with the interactive page of the interactive document, and a template for presenting content of a particular type.

Referring again to FIG. 2, a data package for an interactive document is provided to an interactive document distribution platform (208). For example, the interactive document generation platform 120 can provide the data package 140 for the interactive document to the interactive document distribution platform 150 for distribution to various types of computing devices. Referring to FIGS. 5A-5E, example user interface screens are depicted that may be provided to the distribution interface 160 for adapting and distributing interactive documents.

Figure 5A:
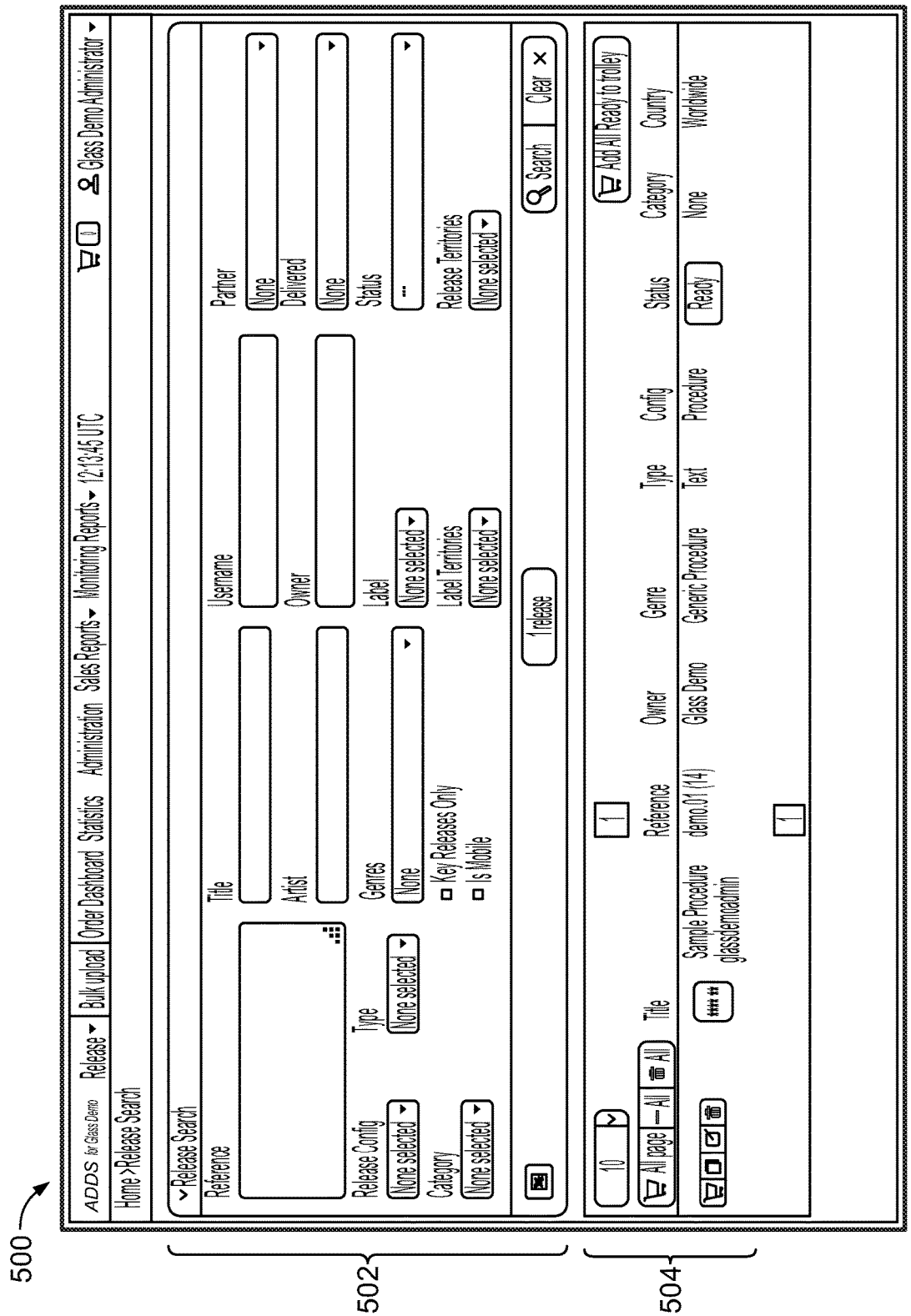

In some implementations, the interactive document distribution platform 150 may be configured for receiving search parameters, retrieving and presenting identification information associated with interactive documents that match the search parameters, and receiving a selection of one or more interactive documents to be provided to a computing device. Referring to FIG. 5A, for example, a user interface screen 500 includes a set of controls 502 for receiving search parameters for searching a repository of published interactive documents. The search parameters, for example, can include an interactive document title, an interactive document reference identifier, a distribution region for the interactive document, and other suitable search parameters. After receiving the search parameters, for example, the interactive document distribution platform 150 can retrieve and provide a list of interactive documents that match the search parameters, and the user interface screen 500 can present the list within a user interface control 504. In the present example, an operator can select one or more list items corresponding to interactive documents (e.g., the interactive document entitled "Sample Procedure") that are to be provided to one or more computing devices.

Figure 5B:
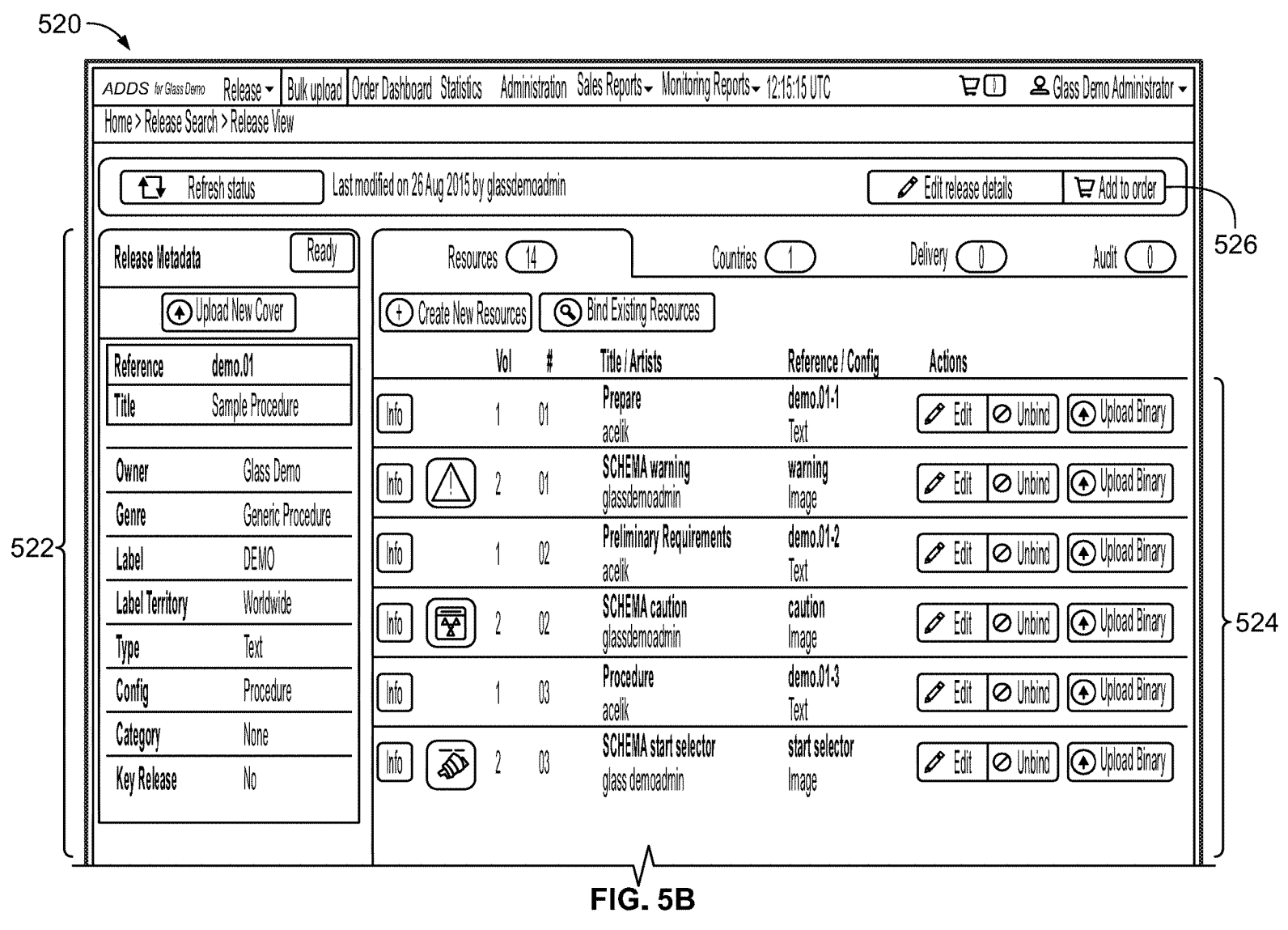
Figure 5B:
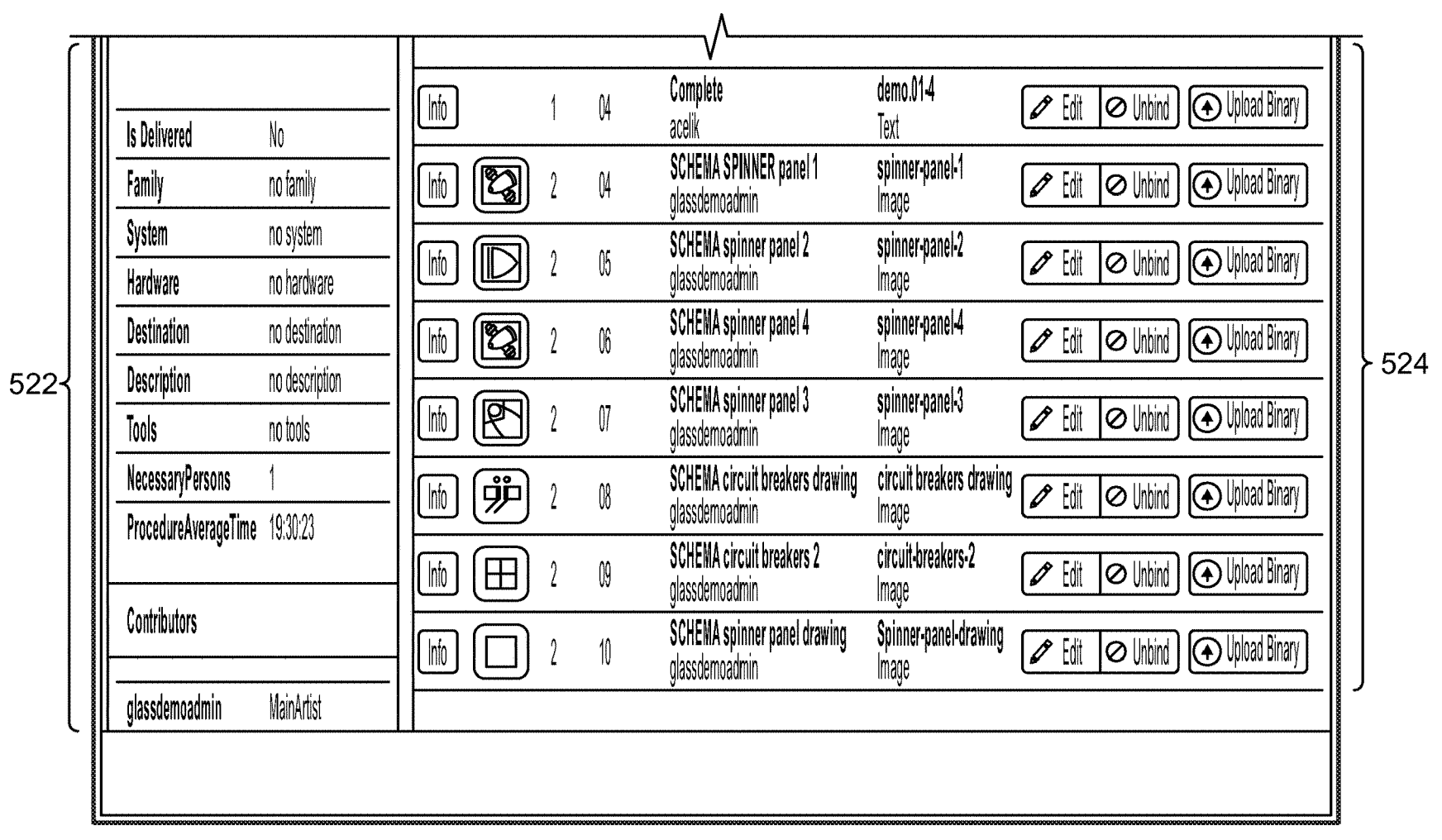

In response to receiving an interactive document selection, the distribution interface 160 can present a user interface screen for presenting information related to the selected interactive document. Referring to FIG. 5B, for example, a user interface screen 520 includes a set of controls 522 for presenting general information related to the selected interactive document, a set of controls 524 for presenting information related to each of the sections and multimedia content items associated with the interactive document, and a control 526 for initiating a process for adapting and distributing the interactive document.

Figure 5C:
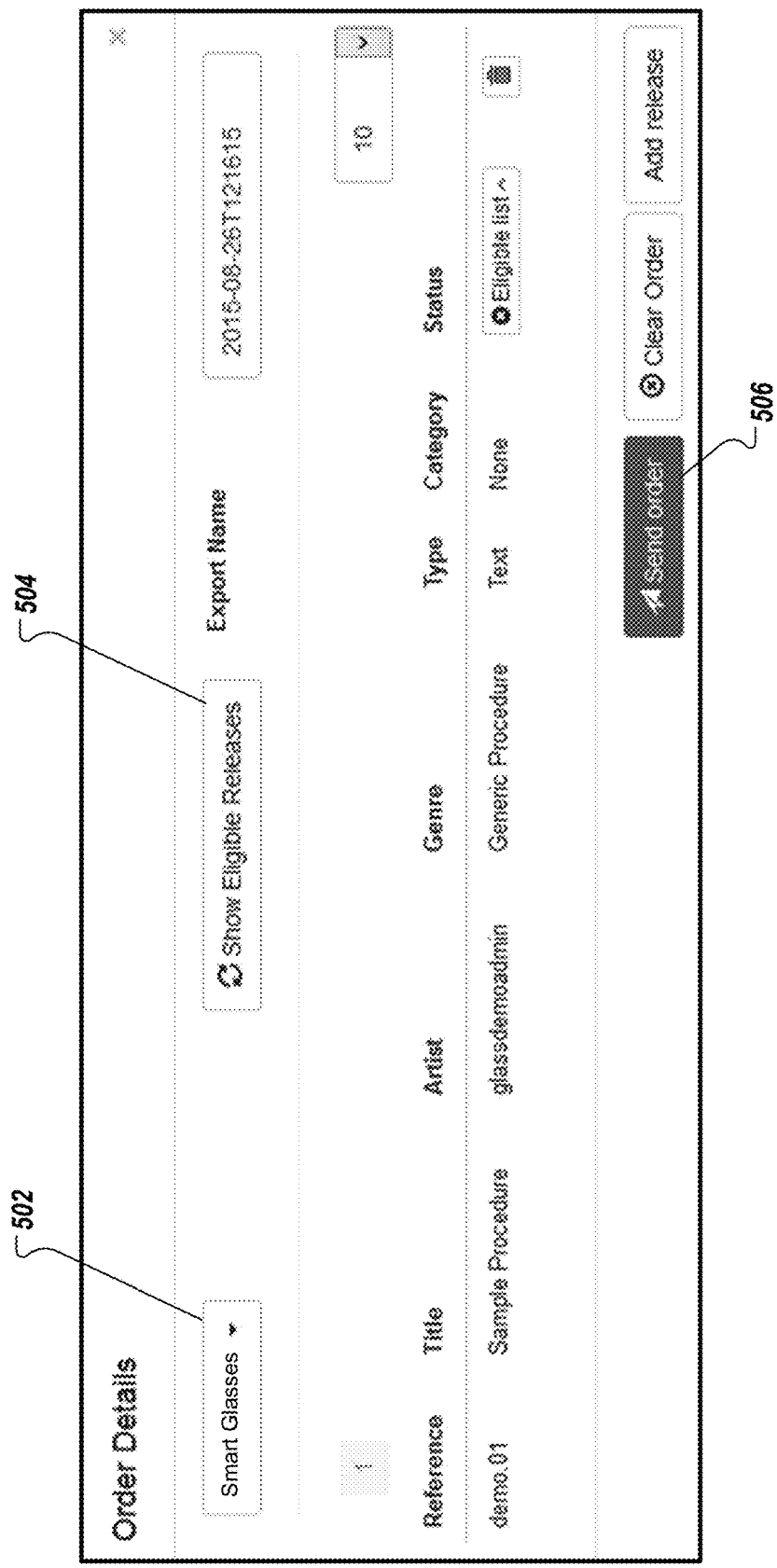

In some implementations, the interactive document distribution platform 150 may be configured for adapting an interactive document for presentation by multiple different types of computing devices, receiving a request for the interactive document for a computing device of a particular type, and providing to the computing device a version of the interactive document that is adapted for presentation by the particular type of the computing device. Referring to FIG. 5C, for example, a user interface screen 540 includes a control 502 for selecting a type of computing device (e.g., smart glasses) for presenting the interactive document. In some implementations, one or more rules for distributing an interactive document may be checked by the interactive document distribution platform 150 before adapting and distributing the document. For example, a plugin can be provided for accessing a repository of rules and determining whether a proposed action violates one or more of the rules. In the present example, a control 504 can be provided for performing an eligibility check on the interactive document. If the interactive document is created for a particular distribution region, for example, but the selected type of computing device (e.g., smart glasses) is unavailable in the distribution region, a request to distribute the interactive document in the distribution region may be denied. A control 506, for example, can be provided for requesting the distribution of the interactive document.

Figure 5D:
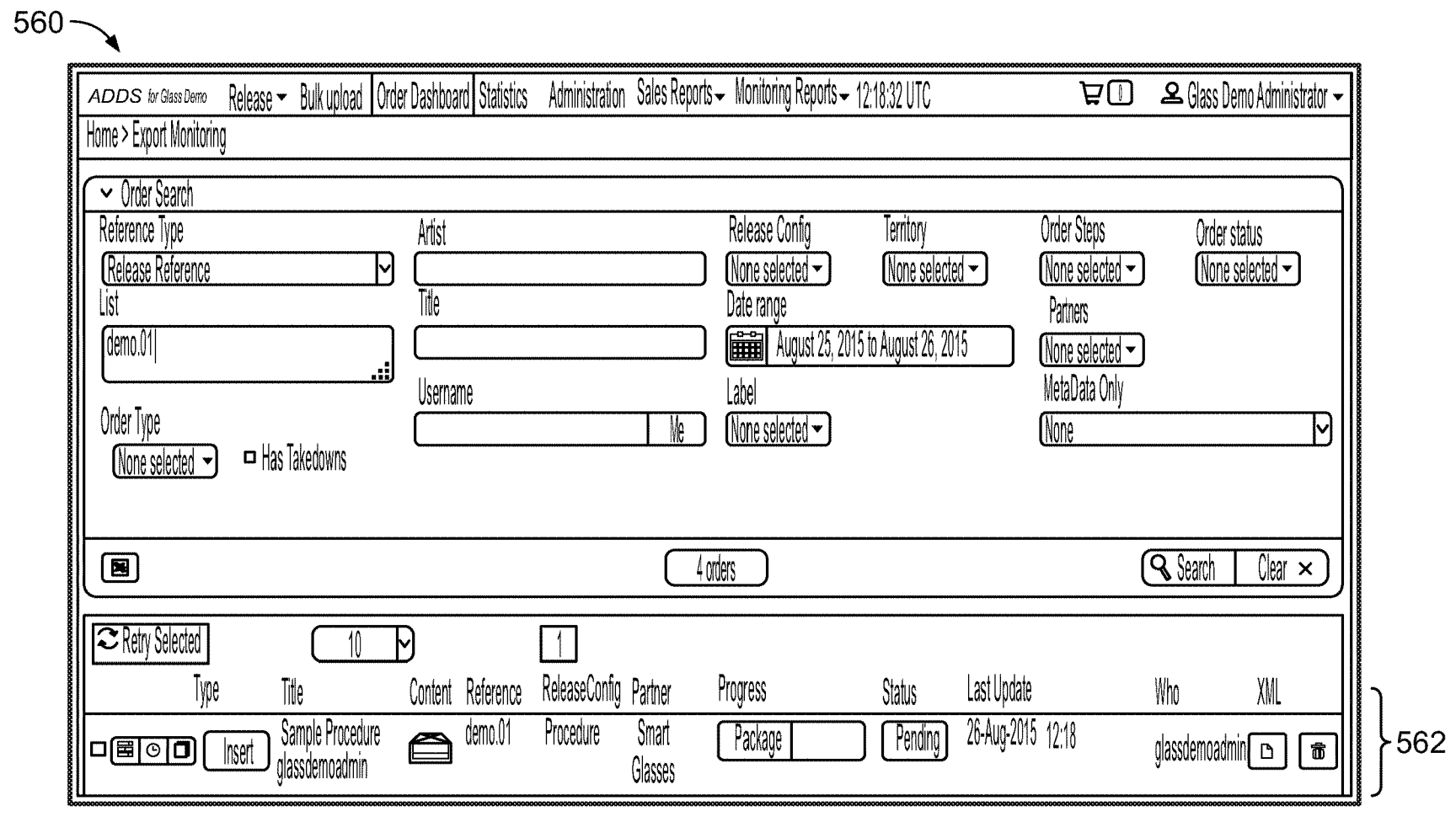

In response to receiving a request for distributing an interactive document, the distribution interface 160 can present a user interface screen for presenting status information associated with distribution of the interactive document. Referring to FIG. 5D, for example, a user interface 560 includes a control 562 for showing status information related to transforming the data package 140 into the adapted data package 170, to prepare the interactive document for distribution to a particular type of computing device (e.g., smart glasses) upon request by the computing device or by another computing device.

Figure 5E:
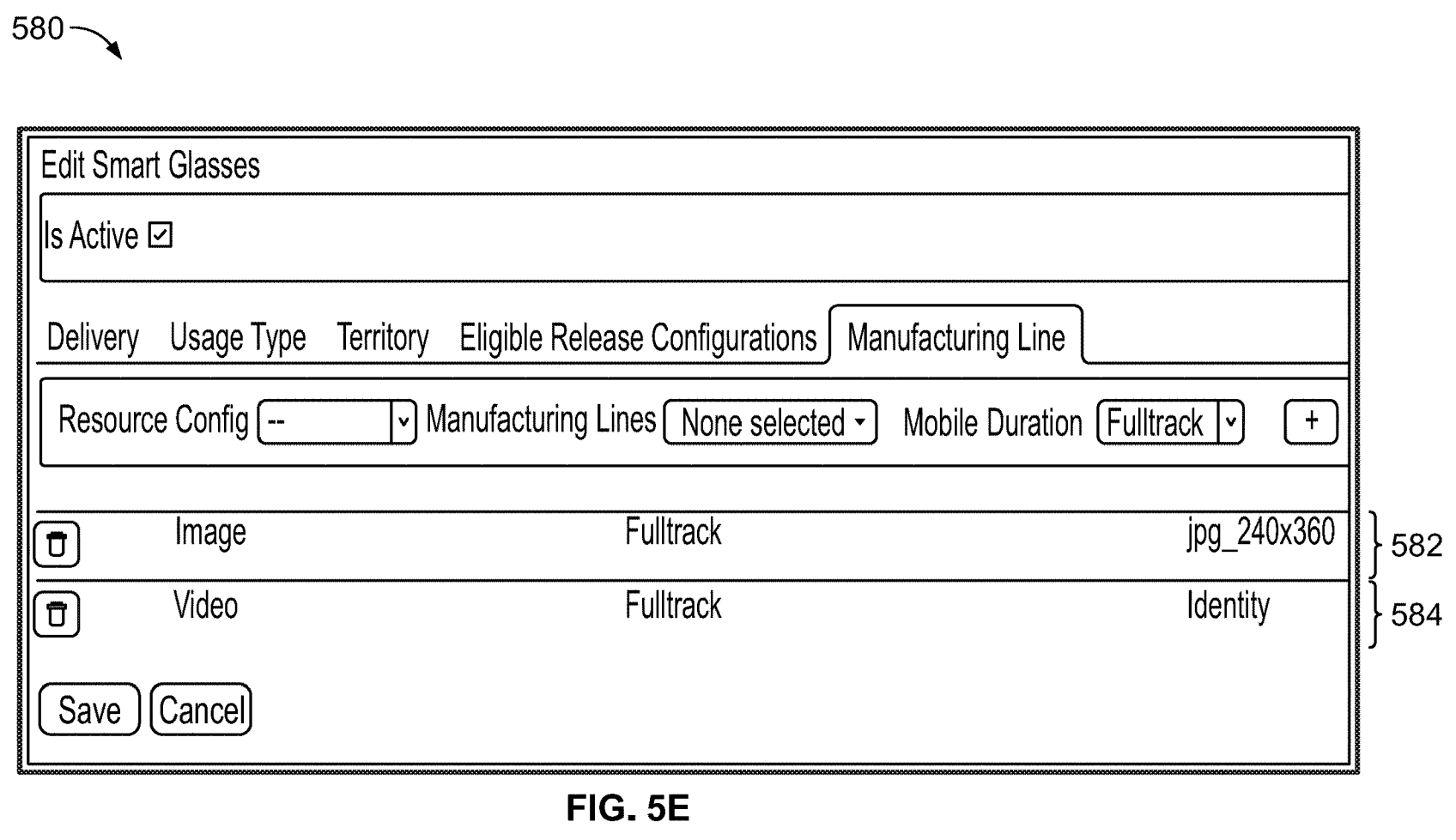

In some implementations, adapting an interactive document for presentation by multiple different types of computing devices includes transforming multimedia content to a format that is suitable for presentation by a particular type of computing device. Referring to FIG. 5E, for example, a user interface 580 includes a control 582 for specifying that for a particular type of computing device (e.g., smart glasses), a particular type of multimedia content (e.g., image content) included with the interactive document is to be transformed to a specified format (e.g., jpg_240×360). As another example, a control 584 can be provided for specifying that another type of multimedia content (e.g., video content) included with the interactive document is to be provided in its original format. After instructions are specified for transforming different types of content for different types of computing devices, for example, the instructions can be implemented automatically when adapting a data package for an interactive document and distributing an adapted data package to a computing device.

Figure 6A:
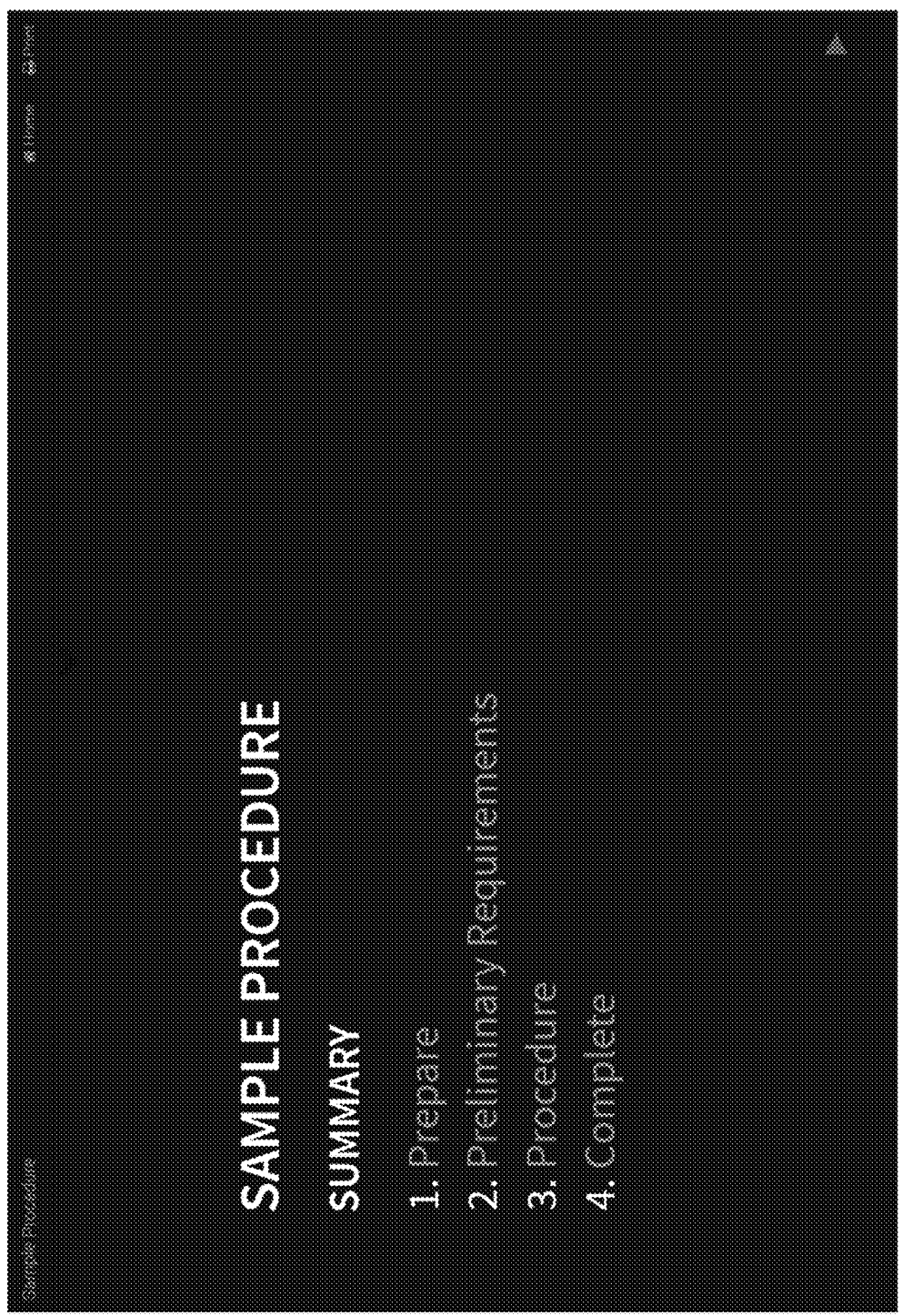
FIGS. 6A-6C depict example user interface screens provided by the example system for presenting interactive documents.
Figure 6B:
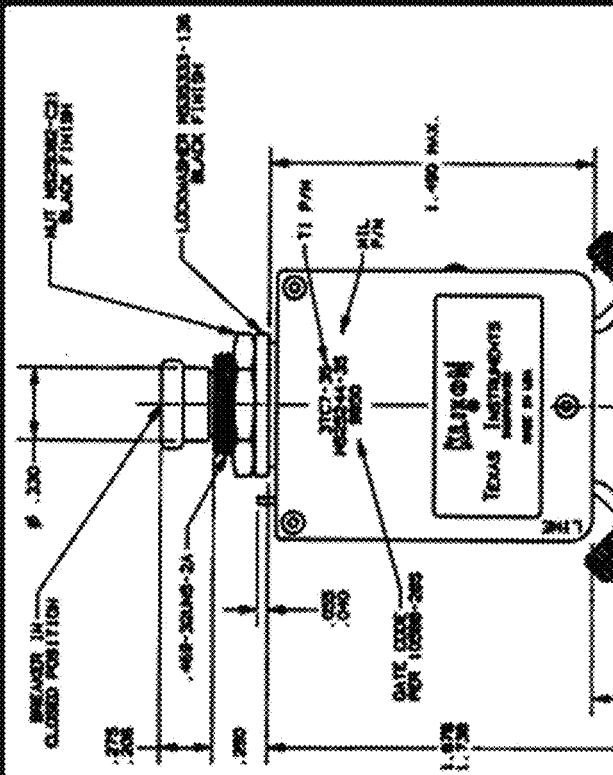
Figure 6C:
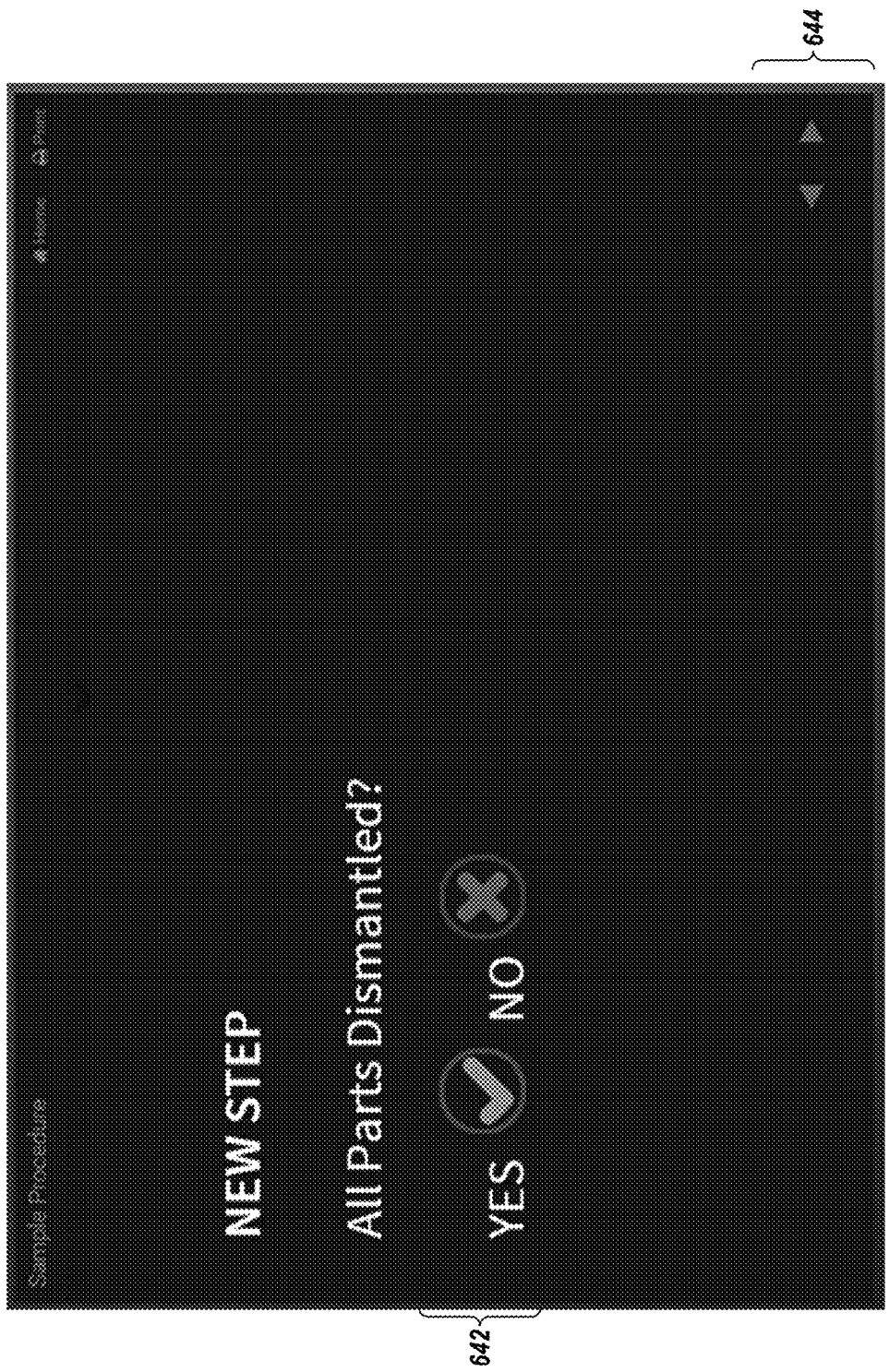

Referring again to FIG. 2, feedback and modification data that pertains to an interactive document presented by a computing device may optionally be received from the computing device and may be processed (210). For example, the interactive document distribution platform 150 and/or the interactive document generation platform 120 can receive information from the computing device 102c collected through the presentation interface 180. Referring to FIGS. 6A-6C, example user interface screens are depicted that may be provided by the presentation interface 180 for presenting interactive documents, and for receiving information related to the documents.

Referring to FIG. 6A, for example, a user interface 600 is shown for presenting an interactive page that includes summary information (e.g., a section list) for an interactive document. The user interface 600, for example, includes a navigation control 602 for navigating to a next page of the interactive document. In general, navigation through an interactive document may correspond to capabilities of a computing device that presents the interactive document. For example, navigation may be accomplished using voice commands, touchscreen swipes, a keyboard, a mouse, or another technique supported by the computing device.

Referring to FIG. 6B, for example, a user interface 620 is shown for presenting an interactive page that includes multimedia content. The user interface 620, for example, includes a presentation area 622 for presenting a multimedia content item (e.g., an audio content item, a video content item, an image, or a link), and a navigation control 624 for navigating backward or forward through the interactive document.

In some implementations, the interactive document distribution platform 150 may be configured for receiving information from a computing device that indicates that a procedure has been completed. Referring to FIG. 6C, for example, a user interface 640 includes a control 642 for indicating that the procedure (or a portion of the procedure) is complete, and a navigation control 644 for navigating backward or forward through the interactive document. The presentation interface 180, for example, can provide information associated with selection of the control 642 to the distribution platform 150 to generate real time status information corresponding to use of the interactive document and performance of the procedure.

In some implementations, the interactive document distribution platform 150 may be configured for receiving modifications to an interactive document from a computing device, and providing the modifications to the interactive document generation platform 120. For example, a user of the presentation interface 180 may identify ambiguities and errors in the interactive document, and may provide suggested revisions to the content. As another example, the user of the presentation interface 180 may provide supplemental multimedia (e.g., audio, video, or images generated by the computing device 102c) for suggested inclusion with a subsequent version of the interactive document. As another example, a feedback mechanism (e.g., a survey) can be provided by the presentation interface 180 to solicit directed feedback regarding the interactive document.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (Application Specific Integrated Circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for generating and distributing interactive documents, the method being executed by one or more processors and comprising:

providing, by an interactive document generation platform, an editor interface for defining a series of interactive pages of an interactive document to be provided for facilitating performance of a procedure, wherein the editor interface includes:
  (i) a multimedia selection control for selecting multimedia content to be presented with a particular interactive page,
  (ii) a text control for providing text to be presented with the particular interactive page, wherein the text control is populated by the interactive document generation platform to include text elements that have been mapped to the interactive document, (iii) a device selection control for selecting a particular type of computing device that is to present the interactive document, and (iv) a presentation control that presents a preview of the particular interactive page as it is to be presented by an interactive document presentation interface of the particular type of computing device, the preview including multimedia content that has been selected and text that has been provided using the editor interface;

receiving, by the interactive document generation platform and through the editor interface, information that defines the series of interactive pages of the interactive document;

receiving, by the interactive document generation platform and through the editor interface, multimedia content to be presented with one or more of the interactive pages of the interactive document;

receiving, by the interactive document generation platform and through the editor interface, text content to be presented with one or more of the interactive pages of the interactive document;

generating, by the interactive document generation platform, a data package that includes metadata, structural data, and multimedia content for the interactive document; and providing the data package that includes metadata, structural data, and multimedia content for the interactive document to an interactive document distribution platform, wherein the interactive document distribution platform is configured for:

adapting the interactive document for presentation by the particular type of computing device of a plurality of different types of computing devices, including transforming the multimedia content, in accordance with stored instructions, to a format that is suitable for presentation by the particular type of computing device, where the instructions include any one or more of (i) cropping the multimedia content, (ii) resizing the multimedia content, or (iii) downsampling the multimedia content;

receiving a request for the interactive document for the particular type of computing device; and providing to a computing device of the particular type, a version of the interactive document that is adapted for presentation by the particular type of computing device.

2. The method of claim 1, wherein the editor interface includes an interface for specifying information for identification of the interactive document and guidelines for performance of the procedure.

3. The method of claim 1, wherein the editor interface includes an interface for defining sections of the interactive document.

4. The method of claim 1, wherein the editor interface includes an interface for specifying multimedia content to be presented with one or more of the interactive pages of the interactive document.

5. The method of claim 1, further comprising receiving a static document, accessing a mapping component that maps text elements of the static document to text elements of the interactive document, and populating the editor interface to include text elements of the static document that have been mapped to text elements of the interactive document.

6. The method of claim 1, wherein the metadata includes information for identification of the interactive document and guidelines for performance of the procedure, and wherein generating the data package comprises generating a file for providing the metadata.

7. The method of claim 1, further comprising receiving, by the interactive document generation platform, information that defines a plurality of sections of the interactive document, wherein each section includes one or more interactive pages.

8. The method of claim 7, wherein the structural data includes definition information for each of the plurality of sections and definition information for the one or more interactive pages included in each section, and wherein generating the data package comprises generating a different file for providing the structural data for each section.

9. The method of claim 8, wherein the definition information for each of the one or more interactive pages includes information for sequencing the interactive page in the interactive document, content to be presented with the interactive page of the interactive document, and a template for presenting content of a particular type.

10. The method of claim 1, wherein the interactive document distribution platform is configured for receiving one or more search parameters, retrieving and presenting identification information associated with one or more interactive documents that match the one or more search parameters, and receiving a selection of one or more of the interactive documents to be provided to the computing device.

11. The method of claim 1, wherein the interactive document distribution platform is configured for receiving information from the computing device that indicates that the procedure has been completed.

12. The method of claim 1, wherein the interactive document distribution platform is configured for receiving modifications to the interactive document from the computing device, and providing the modifications to the interactive document generation platform.

13. A non-transitory computer-readable storage medium coupled to one or more processors and having instructions stored thereon which, when executed by the one or more processors, cause the one or more processors to perform operations for generating and distributing interactive documents, the operations comprising:

providing, by an interactive document generation platform, an editor interface for defining a series of interactive pages of an interactive document to be provided for facilitating performance of a procedure, wherein the editor interface includes:

(i) a multimedia selection control for selecting multimedia content to be presented with a particular interactive page, (ii) a text control for providing text to be presented with the particular interactive page, wherein the text control is populated by the interactive document generation platform to include text elements that have been mapped to the interactive document, (iii) a device selection control for selecting a particular type of computing device that is to present the interactive document, and (iv) a presentation control that presents a preview of the particular interactive page as it is to be presented by an interactive document presentation interface of the particular type of computing device, the preview including multimedia content that has been selected and text that has been provided using the editor interface;

receiving, by the interactive document generation platform and through the editor interface, information that defines the series of interactive pages of the interactive document;

receiving, by the interactive document generation platform and through the editor interface, multimedia content to be presented with one or more of the interactive pages of the interactive document;

receiving, by the interactive document generation platform and through the editor interface, text content to be presented with one or more of the interactive pages of the interactive document;

generating, by the interactive document generation platform, a data package that includes metadata, structural data, and multimedia content for the interactive document; and providing the data package that includes metadata, structural data, and multimedia content for the interactive document to an interactive document distribution platform, wherein the interactive document distribution platform is configured for:

adapting the interactive document for presentation by the particular type of computing device of a plurality of different types of computing devices, including transforming the multimedia content, in accordance with stored instructions, to a format that is suitable for presentation by the particular type of computing device, where the instructions include any one or more of (i) cropping the multimedia content, (ii) resizing the multimedia content, or (iii) downsampling the multimedia content;

receiving a request for the interactive document for the particular type of computing device; and providing to a computing device of the particular type, a version of the interactive document that is adapted for presentation by the particular type of computing device.

14. The computer-readable storage medium of claim 13, wherein the information that defines the series of interactive pages is included in a static document, and wherein the method further comprises receiving the static document, accessing a mapping component that maps elements of the static document to elements of the interactive document, and populating the editor interface to include mapped elements of the interactive document.

15. A system, comprising:
  one or more processors; and
  a computer-readable storage device coupled to the one or more processors and having instructions stored thereon which, when executed by the one or more processors, cause the one or more processors to perform operations for generating and distributing interactive documents, the operations comprising:
    providing, by an interactive document generation platform, an editor interface for defining a series of interactive pages of an interactive document to be provided for facilitating performance of a procedure, wherein the editor interface includes:

(i) a multimedia selection control for selecting multimedia content to be presented with a particular interactive page,
      (ii) a text control for providing text to be presented with the particular interactive page, wherein the text control is populated by the interactive document generation platform to include text elements that have been mapped to the interactive document,
      (iii) a device selection control for selecting a particular type of computing device that is to present the interactive document, and
      (iv) a presentation control that presents a preview of the particular interactive page as it is to be presented by an interactive document presentation interface of the particular type of computing device, the preview including multimedia content that has been selected and text that has been provided using the editor interface;

receiving, by the interactive document generation platform and through the editor interface, information that defines the series of interactive pages of the interactive document;

receiving, by the interactive document generation platform and through the editor interface, multimedia content to be presented with one or more of the interactive pages of the interactive document;

receiving, by the interactive document generation platform and through the editor interface, text content to be presented with one or more of the interactive pages of the interactive document;

generating, by the interactive document generation platform, a data package that includes metadata, structural data, and multimedia content for the interactive document; and providing the data package that includes metadata, structural data, and multimedia content for the interactive document to an interactive document distribution platform, wherein the interactive document distribution platform is configured for:

adapting the interactive document for presentation by the particular type of computing device of a plurality of different types of computing devices, including transforming the multimedia content, in accordance with stored instructions, to a format that is suitable for presentation by the particular type of computing device, where the instructions include any one or more of (i) cropping the multimedia content, (ii) resizing the multimedia content, or (iii) downsampling the multimedia content;

receiving a request for the interactive document for the particular type of computing device; and providing to a computing device of the particular type, a version of the interactive document that is adapted for presentation by the particular type of computing device.

* * * * *